United States Patent

Colton et al.

[15] 3,697,509

[45] Oct. 10, 1972

[54] N-(3-OXOPREGNA-4, 17(20)-DIEN-21-YL) QUATERNARY SALTS AND 19-NOR DERIVATIVES CORRESPONDING

[72] Inventors: Frank B. Colton, Evanston; Richard A. Mikulec, Chicago; Robert T. Nicholson, Glenview, all of Ill.

[73] Assignee: G. D. Searle & Co., Chicago, Ill.

[22] Filed: April 13, 1970

[21] Appl. No.: 28,001

[52] U.S. Cl. .........260/239.5, 260/239.55, 260/397.3
[51] Int. Cl..............................................C07c 173/00
[58] Field of Search.................................260/239.5

[56] References Cited

UNITED STATES PATENTS 2,720,523    10/1955    MacPhillamy..........260/239.5
3,072,531    1/1963    Godtfredsen et al. ...260/239.5

FOREIGN PATENTS OR APPLICATIONS 1,003,681    3/1962    Great Britain..........260/239.5

*Primary Examiner*—Elbert L. Roberts
*Attorney*—John M. Brown, John J. Kolano, Elliot N. Schubert, Lowell C. Bergstedt, Sybil Meloy, Walter C. Ramm and Helmuth A. Wegner

[57] ABSTRACT

N-(3-oxopregna-4,17(20)-dien-21-yl) quaternary salts and the 19-nor derivatives thereof are prepared by alkylation of the appropriate amine with a 21-halopregna-4,17(20)-dien-3-one or a 21-halo-19-norpregna-4,17(20-dien-3-one followed, if necessary, by ion exchange. These quaternary salts display antimicrobial properties, e.g., anti-bacterial, anti-protozoal, anti-fungal, anti-algal and anthelmintic.

10 Claims, No Drawings

N-(3-OXOPREGNA-4,17(20)-DIEN-21-YL) QUATERNARY SALTS AND 19-NOR DERIVATIVES CORRESPONDING

The present invention relates to novel steroidal quaternary salts and, in particular, to those salts containing a 3-oxopregnadiene or 3-oxo-19-norpregnadiene structure as represented by the following structural formula

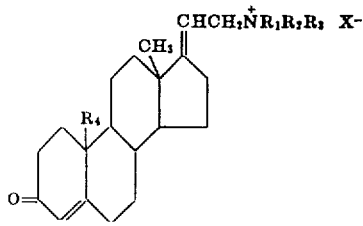

wherein $R_1$ and $R_2$ denote a lower alkyl radical, $R_3$ is a lower alkyl, benzyl or cyclohexyl radical or $NR_1R_2R_3$ comprises an N-methylmorpholinium radical or radical of the formula

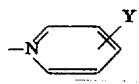

in which Y is a methyl or ethoxycarbonyl group, $R_4$ is hydrogen or a methyl radical and $X^{1\ominus}$ is a halide, hydrogen bifluoride or nitrate ion.

Particularly preferred compounds of this invention are those represented by the following formula

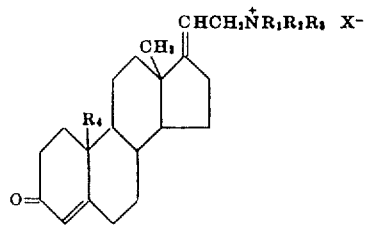

wherein $R_1$ and $R_2$ denote a lower alkyl radical, $R_3$ is a lower alkyl, benzyl or cyclohexyl radical or $NR_1R_2R_3$ comprises an N-methylmorpholinium radical, $R_4$ is hydrogen or a methyl radical and $X^{1\ominus}$ is a halide, hydrogen bifluoride or nitrate ion.

The term lower alkyl embraces those radicals containing less than eight carbon atoms, i.e., methyl, ethyl, propyl, butyl, pentyl, hexyl, heptyl, and the branched-chain isomers thereof.

The halide ions comprehended in that formula include fluoride, chloride, bromide and iodide.

Suitable starting materials for manufacture of the compounds of this invention are the 21-halo substances of the following structural formula

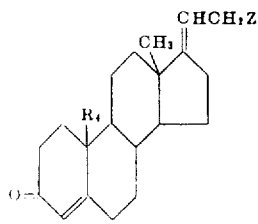

wherein Z is bromo or chloro and $R_4$ is hydrogen or methyl. Reaction of those substances with the appropriate tertiary amine results in the instant corresponding quaternary salts. That process is specifically illustrated by the reaction of 21-bromopregna-4,17(20)-dien-3-one with β-picoline in benzene solution at the reflux temperature to afford N-(3-oxopregna-4,17(20)-dien-21-yl)-β-picolinium bromide.

A particularly convenient method for obtaining the quaternary iodide salts of this invention consists of anion exchange by means of an appropriate quaternary ammonium iodide anion exchange resin. Typically, a methanol solution of N,N,N-triethyl-(3-oxopregna-4,17(20)-dien-21-yl)ammonium bromide is passed through a column consisting of a polystyrene quaternary ammonium iodide anion exchange resin, thus yielding the corresponding iodide.

The instant nitrate, fluoride and hydrogen bifluoride quaternary salts are, similarly, produced by ion exchange utilizing an appropriate inorganic salt. Examples of suitable inorganic salts are sodium nitrate and silver fluoride.

The compounds of this invention display valuable pharmacological properties. They are, for example, anti-microbial agents as evidenced by their anti-bacterial activity, in particular against *Bacillus subtilis*, *Escherichia coli*, *Salmonella paratyphi* A and *Erwinia* sp., their anti-protozoal activity, in particular against *Trichomonas vaginalis* and *Tetrahymena pyriformis*, their anthelmintic activity, specifically against *Turbatrix aceti*, their anti-fungal activity, specifically against *Trichophyton mentagrophytes* and *Candida albicans*, and their anti-algal activity, in particular against *Chlorella vulgaris*.

The assay used to detect the anti-bacterial activity of the instant compounds is described as follows:

A nutrient broth (manufactured by Baltimore Biological Laboratories or Difco) is prepared at twice the concentration recommended by the manufacturer, sterilized, then inoculated with 2 percent (by volume) of a culture of *Bacillus subtilis*, *Escherichia coli*, *Salmonella paratyphi* A or *Erwinia* sp. Meanwhile, the test compound is heated in sterile distilled water at a concentration of 2,000 mcg./ml. and a temperature of 80° C. for 20 minutes. An equivolume mixture of this compound preparation and the inoculated broth is incubated aerobically at 37° C., then is examined grossly for growth of the test organism. The incubation period is 24–48 hours for *Erwinia* sp. and 20–24 hours for the other three organisms. If growth of the test organism is observed, the compound is considered inactive. If no such growth is observed, the incubated mixture is serially diluted and mixed with an inoculated broth of the same composition as before excepting that the concentration is halved and 1 percent (by volume) of the culture instead of 2 percent is incorporated. Amounts of the latter broth added are such that concentrations of 100, 10 and 1 mcg. of compound per ml. result. The mixtures thus obtained are incubated as before, then examined grossly for growth of the test organism. Potency is expressed as the minimum concentration at which no growth of test organism is discernible. Controls are provided by concurrent incubations identical with the foregoing except for the absence of the test compound.

The anti-protozoal activity of the compounds of the present invention is determined by assays utilizing either *Trichomonas vaginalis* or *Tetrahymena pyriformis*. In the former assay, 80 volumes of a modified Diamond medium prepared by mixing 1,200 parts of trypticase (Baltimore Biological Laboratories), 600 parts of yeast extract, (Difco), 300 parts of maltose, 60 parts of L-cysteine hydrochloride, 12 parts of L-ascorbic acid, 48 parts of dibasic potassium phosphate, 48 parts of monobasic potassium phosphate and 27,000 parts of distilled water; adjusting the pH to 6.8 with aqueous 4 percent sodium hydroxide; incorporating 30 parts of agar (Baltimore Biological Laboratories); boiling for 1 minute to dissolve the agar; and sterilizing is diluted with 20 volumes of sterile Dubos medium serum. The resulting medium is inoculated with 2 percent (by volume) of either a 48-hour or a 72-hour culture of Trichomonas vaginalis. Meanwhile, the test compound is heated in sterile distilled water at a concentration of 2,000 mcg./ml. and a temperature of 80° C. for 20 minutes. An equivolume mixture of this compound preparation and the inoculated medium is incubated anaerobically at 37° C. for 48 hours, then is examined microscopically for the presence of motile trichomonads. If any are observed, the compound is considered inactive. If no motile trichomonads are observed, the incubated mixture is serially diluted and mixed with an inoculated medium of the same composition as that described above excepting that 54,000 parts of distilled water instead of 27,000 parts and 1 percent (by volume) of the culture instead of 2 percent are incorporated. Amounts of the latter medium added are such that concentrations of 1,000, 10 and 1 mcg. of compound per ml. result. The mixtures thus obtained are incubated as before and then examined microscopically for motile trichomonads. Potency is expressed as the minimum concentration at which no motile trichomonads are discernible. Controls are provided by concurrent incubations identical with the foregoing except for the absence of the test compound.

In the latter assay, a nutrient broth consisting of 12 g. of proteose peptone, 8 g. of sucrose and 500 ml. of water is sterilized and inoculated with 10 percent (by volume) of an axenic culture of *Tetrahymena pyriformis*. Meanwhile, the test compound is heated in sterile distilled water at a concentration of 2,000 mcg. per ml. and a temperature of 80° C. for 20 minutes. An equivolume mixture of this compound preparation and the inoculated medium is incubated aerobically at 32° C. for 48 hours, then is examined microscopically for the presence of motile tetrahymena. If any are observed, the compound is considered inactive. If no motile tetrahymena are observed, the incubated mixture is serially diluted and mixed with an inoculated medium of the same composition as that described above excepting that 1,000 parts of distilled water instead of 500 parts and 5 percent (by volume) of the culture instead of 10 percent are incorporated. The amounts of the latter medium added are such that concentrations of 1,000, 10 and 1 mcg. of compound per ml. result. The mixtures thus obtained are incubated as before and then examined microscopically for motile tetrahymena. Potency is expressed as the minimum concentration at which no motile tetrahymena are discernible. Controls are provided by concurrent incubations identical with the foregoing except for absence of the test compound.

Evidence for the anthelmintic activity of the instant compounds is provided by an assay utilizing *Turbatrix aceti*, a representative nematode. In this assay, the test compound is heated in sterile distilled water at a concentration of 2,000 mcg./ml. and a temperature of 80° C. for 20 minutes, whereupon an equivolume mixture of this compound preparation and a washed aqueous suspension of *Turbatrix aceti* containing approximately 2,000 nematodes per ml. is incubated anaerobically at room temperature for 48 hours and then examined grossly for the presence of motile nematodes. If any are observed, the compound is considered inactive. If no motile nematodes are observed, the incubated mixture is serially diluted and mixed with a freshly prepared and washed aqueous suspension of *Turbatrix aceti* containing approximately 1,000 nematodes per ml. in amounts such that concentrations of 100, 10 and 1 mcg. of compound per ml. result. The mixtures thus obtained are incubated as before and then examined grossly for the presence of motile nematodes. Potency is expressed as the minimum concentration at which no motile nematodes are discernible. Controls are provided by concurrent incubations identical with the foregoing except for absence of the test compound.

Confirmation of the anti-fungal activity of the compounds of this invention is afforded by an assay utilizing either *Trichophyton mentagrophytes* or *Candida albicans*. In this assay, the test compound is dissolved or suspended in melted Sabouraud agar and is held at 80° C. for 20 minutes. Dilutions are made from this preparation in melted Sabouraud agar in order to give concentrations of the test substance of 1,000, 100, 10 and 1 mcg./ml. in the agar. The agar is permitted to cool and solidify and is then surface inoculated with a suspension of spores of *Trichophyton mentagrophytes* or *Candida albicans*. The inoculated media are incubated at room temperature, those containing *Candida albicans* for about 48 hours and those containing *Trichophyton mentagrophytes* for 6–7 days, then are examined grossly for the presence or absence of growth of the test organism. Control preparations lacking the test compound are employed for comparative purposes. Activity is reported as mcg. of the compound/ml. of agar which completely prevents visible growth of the test organism.

The anti-algal property of the instant compounds is demonstrated by their activity in the following assay:

Sterile Bristol medium of two times the normal concentration is inoculated with an aqueous suspension of *Chlorella vulgaris* and 0.5 ml. of that inoculated medium is mixed with 0.5 ml. of a stock solution or suspension of the test compound in sterile distilled water prepared at a concentration of 2 mg./ml. Serial dilutions are made using single strength Bristol medium, thus affording mixtures having concentrations of 1,000, 100, 10 and 1 mcg./ml. Those inoculated media are incubated at room temperature under artificial light for 4–5 days, then are examined macroscopically for the presence or absence of growth of the organism. The activity of the test compound is reported as the concentration at which no algal growth is observed. A control mixture identical save for omission of the test compound is prepared for comparison purposes.

The invention will appear more fully from the examples which follow. These examples are set forth by way of illustration only and it will be understood that the invention is not to be construed as limited thereby either in spirit or in scope as many modifications both in materials and in methods will be apparent from this disclosure to those skilled in the art. In these examples temperatures are given in degrees Centigrade (° C.) and quantities of materials in parts by weight unless otherwise noted.

EXAMPLE 1

To a solution containing 2 parts of 21-bromo-19-norpregna-4,17(20)-dien-3-one in 22 parts of benzene is added 1.9 parts of triethylamine and the resulting reaction mixture is stirred at room temperature for about 20 minutes, then is heated at the reflux temperature for about 1 hour. After cooling to room temperature, the precipitated crude product is collected by filtration and dried to afford N,N,N-triethyl-(3-oxo-19-norpregna-4,17(20)-dien-21-yl)ammonium bromide, melting at about 183°–185° with decomposition. Recrystallization from ethanol-ether has no effect on the melting point. This compound is represented by the following structural formula

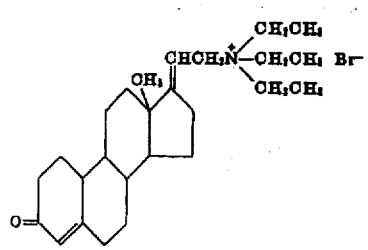

EXAMPLE 2

A solution containing 1.66 parts of 21-bromopregna-4,17(20)dien-3-one, 26.4 parts of benzene and 1.53 parts of triethylamine is heated and stirred at the reflux temperature for about 1 hour in a nitrogen atmosphere. After completion of that reaction period, the mixture is cooled to room temperature and the resulting precipitated white crystalline solid is collected by filtration, washed with fresh benzene and dried under reduced pressure. The resulting crude product, melting at 189°–192°, is purified by recrystallization from acetone, thus affording pure N,N,N-triethyl-(3-oxopregna-4,17(20)-dien-21-yl)ammonium bromide, melting at about 190°–192°. This compound is represented by the following structural formula

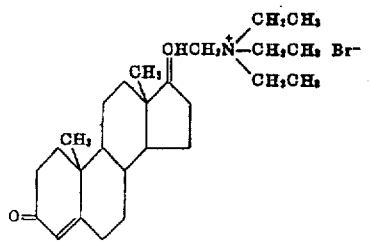

EXAMPLE 3

To a solution containing 3.77 parts of 21-bromopregna-4,17(20)-dien-3-one and 88 parts of benzene is added 20 parts by volume of a 25 percent trimethylamine in methanol solution. The resulting mixture is heated at the reflux temperature with stirring for about 1 hour, then is allowed to cool to room temperature. The precipitate which forms is collected by filtration and dried, then purified by recrystallization from ethanol-ether to afford, as faintly yellow prismatic crystals, N,N,N-trimethyl-(3-oxopregna-4,17(20)-dien-21-yl)ammonium bromide, melting at about 241.5°–243°. This compound is represented by the following structural formula

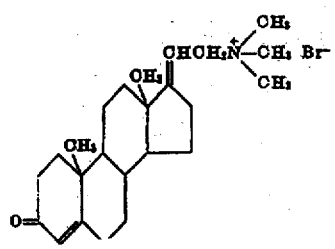

EXAMPLE 4

A solution of 3.77 parts of 21-bromopregna-4,17(20)-dien-3-one in 88 parts of benzene is prepared and 3.8 parts of tri-n-propylamine is added. The resulting reaction mixture is heated at the reflux temperature with stirring and, after 1 hour, is allowed to cool to room temperature. The precipitate which forms upon cooling is collected by filtration, then is dried and recrystallized from isopropyl alcohol-ether, thus affording N,N,N-tri-n-propyl-(3-oxopregna-4,17(20)-dien-21-yl)ammonium bromide as colorless prismatic crystals, melting at about 175.5°–176°. This compound is characterized further by the following structural formula

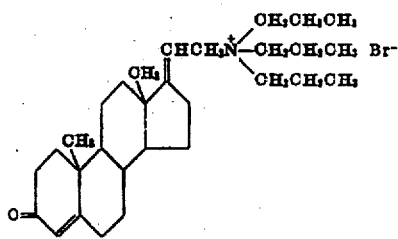

EXAMPLE 5

To a solution containing 3.77 parts of 21-bromopregna-4,17(20)-dien-3-one and 88 parts of benzene is added 4.8 parts of β-picoline. The solution which results is heated at the reflux temperature with stirring for about 1 hour, then is allowed to cool to room temperature. The resulting precipitated product is collected by filtration, dried, then purified by recrystallization from isopropyl alcohol-ether, thus affording colorless prism-like crystals of N-(3-oxopregna-4,17(20)-dien-21-yl)-β-picolinium bromide monohydrate, which melts at about 167.5°–168.5°. It is represented by the following structural formula

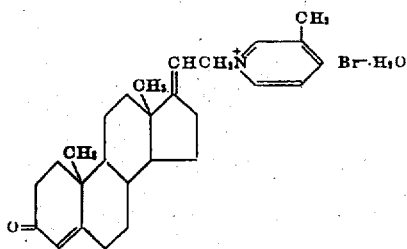

EXAMPLE 6

A solution containing 3.77 parts of 21-bromopregna-4,17(20)-dien-3-one, 4.6 parts of N,N-dimethylbenzylamine and 88 parts of benzene is heated with stirring at the reflux temperature for about 1 hour, then is allowed to cool to room temperature. The precipitated product is collected by filtration and purified by recrystallization from benzene-methanol. Drying of that recrystallized material under reduced pressure at about 100° affords N-benzyl-N,N-dimethyl-(3-oxopregna-4,17(20)-dien-21-yl)ammonium bromide hemihydrate, melting at about 168.5°–170°. This compound is represented by the following structural formula

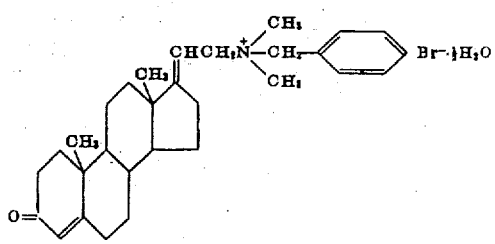

EXAMPLE 7

To a solution consisting of 3.77 parts of 21-bromopregna-4,17(20)-dien-3-one and 88 parts of benzene is added 4.8 parts of γ-picoline. The solution which results is heated at the reflux temperature with stirring for about 1 hour and is then cooled to room temperature. The precipitate which forms is collected by filtration, dried and purified by recrystallization from methanol-ether, thus affording colorless needle-like crystals of N-(3-oxopregna-4,17(20)-dien-21-yl)-γ-picolinium bromide hemihydrate hemimethanolate, melting at about 183.5°–184.5°. This compound is represented by the following structural formula

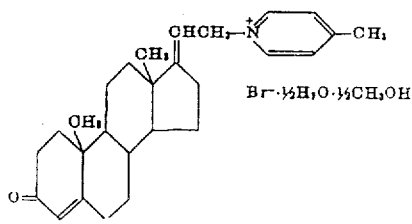

EXAMPLE 8

To a solution containing 3.77 parts of 21-bromopregna-4,17(20)-dien-3-one in 88 parts of benzene is added 4.8 parts of α-picoline. The resulting reaction mixture is heated at the reflux temperature with stirring for about 1 hour, then is allowed to cool to room temperature. The precipitate which forms upon cooling is collected by filtration, dried and purified by recrystallization from methanol-ether, thus affording colorless needle-like crystals of N-(3-oxopregna-4,17(20)-dien-21-yl)-α-picolinium bromide hemihydrate hemimethanolate, melting at about 184°–185°. This compound is characterized further by the following structural formula

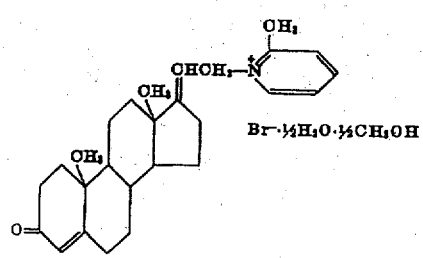

EXAMPLE 9

To a solution of 3.77 parts of 21-bromopregna-4,17(20)-dien-3-one in 88 parts of benzene is added 5 parts by volume of ethyl isonicotinate. The resulting reaction mixture is heated with stirring at the reflux temperature for about 1 hour, then is allowed to cool to room temperature. The precipitate which forms is collected by filtration, dried and purified by recrystallization from acetone-ethyl acetate, thus affording yellow prism-like crystals of 4-ethoxycarbonyl-N-(3-oxopregna-4,17(20)-dien-21-yl)pyridinium bromide hemihydrate, melting at about 159.5°–160.5°. This compound is represented by the following structural formula

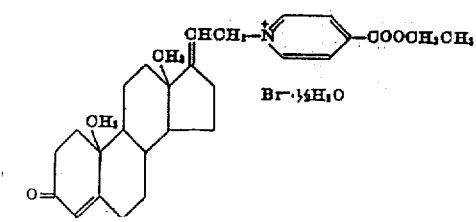

EXAMPLE 10

A solution containing 1.91 parts of N,N,N-triethyl-(3-oxopregna-4,17(20)-dien-21-yl)ammonium bromide dissolved in 160 parts of methanol is passed through a column containing 25 parts of a polystyrene quaternary ammonium chloride anion exchange resin. An additional 160 parts of methanol is then passed through the column and the combined effluent is evaporated to dryness under reduced pressure. The resulting residue is purified by recrystallization from acetone-ether to afford colorless plate-like crystals of N,N,N-triethyl-(3-oxopregna-4,17(20)-dien-21-yl)ammonium chloride monohydrate, melting at about 183°–184°. This compound is represented by the following structural formula

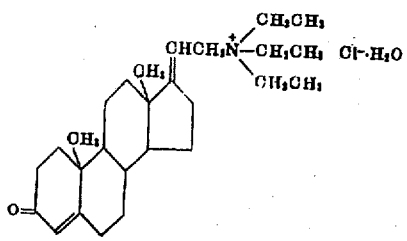

EXAMPLE 11

A solution of 1.91 parts of N,N,N-triethyl-(3-oxopregna-4,17(20)-dien-21-yl)ammonium bromide in 160 parts of methanol is passed through a column consisting of 25 parts of a polystyrene quaternary ammonium iodide anion exchange resin. An additional 160 parts of methanol is then passed through the column and the combined effluent is evaporated to dryness under reduced pressure. Recrystallization of the resulting residue from acetone-ether affords colorless prism-like crystals of N,N,N-triethyl-(3-oxopregna-4,17(20)-dien-21-yl)ammonium iodide, melting at about 184.5°–185°. This compound is represented by the following structural formula

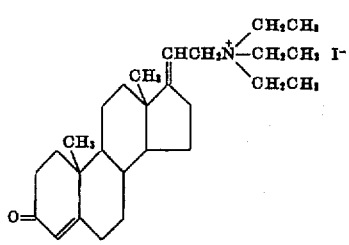

EXAMPLE 12

To a solution of 3.77 parts of 21-bromopregna-4,17(20)-dien-3-one in 88 parts of benzene is added 3.9 parts of tri-n-butylamine and the resulting reaction mixture is stirred at room temperature for about 24 hours. The precipitate which forms is collected by filtration and purified by recrystallization from ethanol-ether, thus affording colorless prism-like crystals of N,N,N-tri-n-butyl-(3-oxopregna-4,17(20)-dien-21-yl)ammonium bromide, melting at about 160.5°–163° and characterized further by the following structural formula

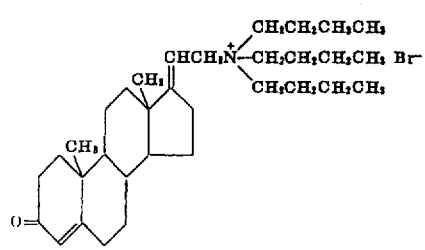

EXAMPLE 13

N,N-diethylcyclohexylamine solution consisting of 3.77 parts of 21-bromopregna-4,17(20)-dien-3-one, 4.4 parts of N,N- and 88 parts of benzene is stirred at room temperature for about 72 hours, at the end of which time the precipitate which forms is collected by filtration, dried, and purified by recrystallization from acetone-ether, thus producing colorless prism-like crystals of N-cyclohexyl-N,N-diethyl-(3-oxopregna-4,17(20)-dien-21-yl)ammonium bromide hemihydrate, melting at about 155.5°–157°. This compound is represented by the following structural formula

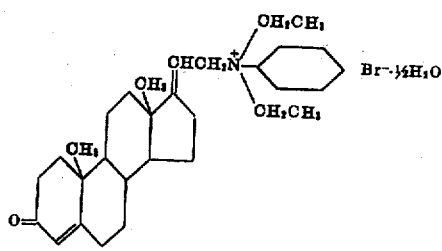

EXAMPLE 14

A solution containing 3.77 parts of 21-bromopregna-4,17(20)-dien-3-one, 5 parts by volume of N-methylmorpholine and 88 parts of benzene is heated at the reflux temperature with stirring for about 1 hour, then is allowed to cool to room temperature. The resulting precipitate is collected by filtration, dried and purified by recrystallization from isopropyl alcohol to afford, as light tan plate-like crystals, N-methyl-N-(3-oxopregna-4,17(20)-dien-21-yl)morpholinium bromide monohydrate, melting at about 199°–200.5°. This compound is represented by the following structural formula

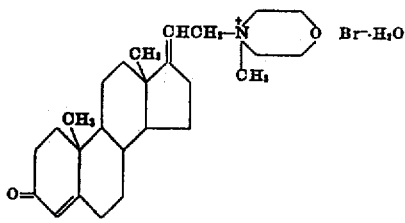

EXAMPLE 15

To a solution of 1.13 parts of N,N,N-tri-n-butyl-(3-oxopregna-4,17(20)-dien-21-yl)ammonium bromide in 200 parts of water is added dropwise 10 parts by volume of saturated aqueous sodium nitrate. The resulting mixture is stirred at room temperature for about 16 hours, then is filtered to remove the precipitate which forms. Recrystallization of that crude product from water results in pure N,N,N-tri-n-butyl-(3-oxopregna-4,17(20)-dien-21-yl)ammonium nitrate as colorless prism-like crystals, melting at about 194°–195.5°. It is represented by the following structural formula

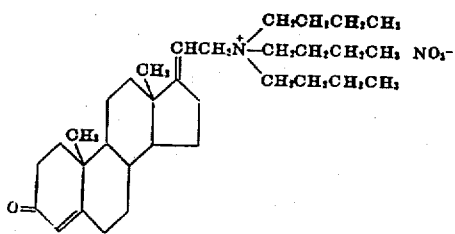

EXAMPLE 16

To a solution of 4.8 parts of N,N,N-triethyl-(3-oxopregna-4,17(20)-dien-21-yl)ammonium bromide in 30 parts of water is added dropwise with stirring a solution of 1.3 parts of silver fluoride in 10 parts of water. The resulting precipitate is removed by filtration and the filtrate is evaporated to dryness under reduced pressure. Recrystallization of the resulting residue from acetone-ether affords tan prism-like crystals of N,N,N-triethyl-(3-oxopregna-4,17(20)-dien-21-yl)ammonium hydrogen bifluoride sesquihydrate, melting with decomposition at about 161°–163°. This compound is represented by the following structural formula

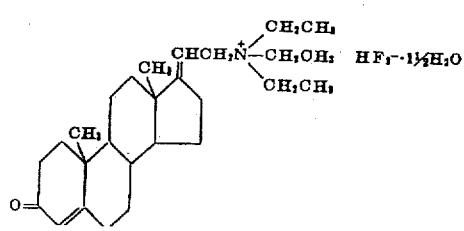

What is claimed is:
1. A compound of the formula

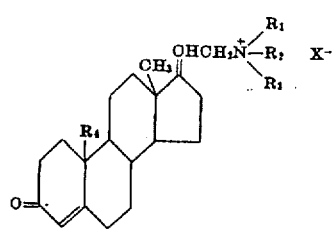

wherein $R_1$ and $R_2$ are lower alkyl radicals, $R_3$ is a lower alkyl, benzyl or cyclohexyl radical or $NR_1R_2R_3$ represents an N-methylmorpholinium radical or radical of the formula

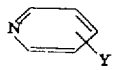

Y being a methyl or ethoxycarbonyl radical. $R_4$ is hydrogen or a methyl radical and $X^-$ represents a halide, hydrogen bifluoride or nitrate ion.

2. As in claim 1, a compound of the formula

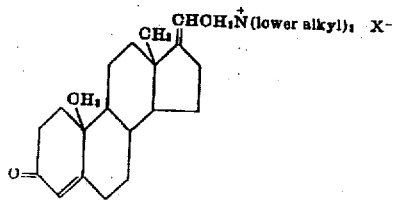

wherein $R_4$ is hydrogen or a lower alkyl radical and $X^-$ represents a halide, hydrogen bifluoride or nitrate ion.

3. As in claim 1, a compound of the formula

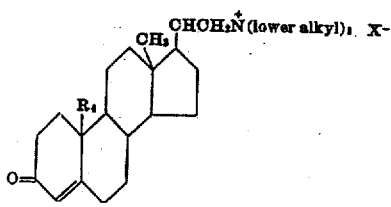

wherein $X^-$ represents a halide, hydrogen bifluoride or nitrate ion.

4. As in claim 1, a compound of the formula

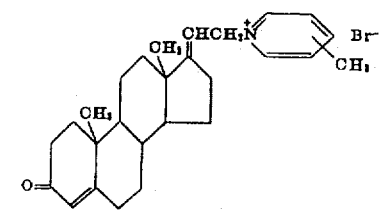

5. As in claim 1, the compound which is N-(3-oxopregna-4,17(20)-dien-21-yl)-β-picolinium bromide.

6. As in claim 1, the compound which is N-benzyl-N,N-dimethyl-(3-oxopregna-4,17(20)-dien-21-yl)-ammonium bromide.

7. As in claim 1, the compound which is N,N,N-tri-n-butyl-(3-oxopregna-4,17(20)-dien-21-yl)-ammonium bromide.

8. As in claim 1, the compound which is N-cyclohexyl-N,N-diethyl-(3-oxopregna-4,17(20)-dien-21-yl)ammonium bromide.

9. As in claim 1, the compound which is N,N,N-tri-n-butyl-(3-oxopregna-4,17(20)-dien-21-yl)-ammonium nitrate.

10. As in claim 1, the compound which is N-(3-oxopregna-4,17(20)-dien-21-yl)-α-picolinium bromide.

* * * * *

UNITED STATES PATENT OFFICE
CERTIFICATE OF CORRECTION

Patent No. 3,697,509          Dated October 10, 1972

Inventor(s) Frank B. Colton, Richard A. Mikulec, & Robert T. Nicholson

It is certified that error appears in the above-identified patent and that said Letters Patent are hereby corrected as shown below:

Title, both locations, "!9-NOR" should be --19-NOR--.

Abstract, lines 5 & 6, "4,17(20-dien" should be --4,17(20)-dien--.

Column 1, line 30, "$X^{116}$" should be --$X^-$--.

Column 1, line 47, "$X^{116}$" should be --$X^-$--.

Column 5, line 44, "4,17(20)dien-" should be --4,17(20)-dien---.

Column 6, line 13, "ammoniun" should be --ammonium--.

Column 10, line 2, "N,N-diethylcyclohexylamine solution consisting of" should be --A solution consisting of--.

Column 10, line 4, "4.4 parts of N,N- and" should be --4.4 parts of N,N-diethylcyclohexylamine and--.

Claim 2, formula

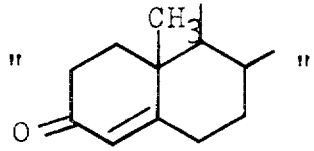     should be     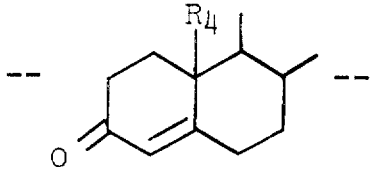

Claim 3, formula

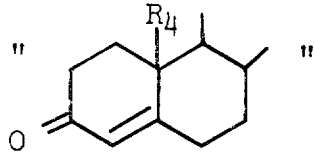     should be     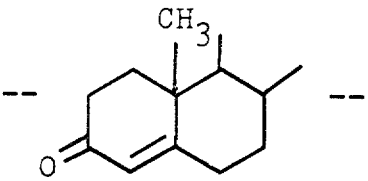

Signed and sealed this 29th day of May 1973.

(SEAL)
Attest:

EDWARD M. FLETCHER, JR.
Attesting Officer

ROBERT GOTTSCHALK
Commissioner of Patents